United States Patent [19]

Yanagimoto et al.

[11] Patent Number: 5,072,985
[45] Date of Patent: Dec. 17, 1991

[54] TRUNK LID STRUCTURE FOR VEHICLE

[75] Inventors: Kazuhiro Yanagimoto, Hamana; Akira Hijikata, Hamamatsu, both of Japan

[73] Assignee: Mitsubishi Jukogyo Kabushiki Kaisha, Tokyo, Japan

[21] Appl. No.: 632,591

[22] Filed: Dec. 21, 1990

Related U.S. Application Data

[63] Continuation of Ser. No. 449,530, Dec. 11, 1989, abandoned.

[30] Foreign Application Priority Data

Feb. 13, 1989 [JP] Japan .............................. 1-33329[U]

[51] Int. Cl.$^5$ .............................................. B62D 25/12
[52] U.S. Cl. ........................................ 296/76; 49/501
[58] Field of Search ................. 49/501, 502; 180/69.2, 180/69.21; 296/76, 188

[56] References Cited

U.S. PATENT DOCUMENTS

| 2,125,761 | 8/1938 | Westrope et al. | 296/76 |
| 2,709,108 | 5/1955 | Eggert, Jr. | 296/76 |
| 2,919,946 | 1/1960 | Miener | 296/76 X |
| 3,082,033 | 3/1963 | Bosher | 296/76 X |
| 3,157,429 | 11/1964 | Harms et al. | 296/76 |
| 3,172,509 | 3/1965 | Dugger | 49/501 |
| 3,808,743 | 5/1974 | Renner et al. | 49/502 |
| 4,097,958 | 7/1978 | Van Dell | 180/69.21 X |
| 4,641,880 | 2/1987 | Ohkubo | 296/76 X |
| 4,838,606 | 6/1989 | Furubayashi et al. | 296/188 |

FOREIGN PATENT DOCUMENTS

| 2405052 | 8/1975 | Fed. Rep. of Germany | 296/76 |
| 73367 | 4/1984 | Japan | 296/76 |
| 113615 | 5/1987 | Japan | 296/76 |

Primary Examiner—Margaret A. Focarino
Assistant Examiner—Andrew C. Pike
Attorney, Agent, or Firm—McGlew & Tuttle

[57] ABSTRACT

A vehicular trunk lid structure is formed by overlapping the end of the outer panel upon the end of the inner panel, to be followed by hemming process, wherein recesses are defined adjacent to the end of said inner panel, and said recesses are deepened toward and welded to said outer panel. By such arrangement, the weld bead due to the spot-welding is concealed inside the trunk room to be obscured from the outside and thus the need of finishing work to remove the weld bead is eliminated. As a consequence, an aesthetic improvement and a manufacturing cost reduction are accomplished.

6 Claims, 2 Drawing Sheets

TRUNK LID STRUCTURE FOR VEHICLE

This is a continuation of application Ser. No. 449,530, filed Dec. 11, 1989, now abandoned.

FIELD OF THE INVENTION

The present invention relates to a trunk lid structure for a vehicle.

In this prior art arrangement of a trunk lid structure, a trunk lid 1 has been formed by overlapping the end 2a of the outer panel 2 upon the end 3a of the inner panel 3, followed by a hemming process and a spot welding which secures the arrangement.

In the above-described structure, since a weld bead is left on a spot-welded portion of the outer panel, the finished trunk lid is impaired aesthetically. Therefore, such a traditional structure requires a finishing process to remove such weld bead. This is disadvantageous as it relates in an increase in cost.

SUMMARY AND OBJECTS OF THE INVENTION

The present invention has been accomplished with the above state of the art as a background, and a main object of the present invention is therefore to provide a trunk lid structure for a vehicle which can be manufactured at a reduced cost.

To achieve the above object, the present invention provides a trunk lid structure for a vehicle, said structure being formed by overlapping the end of the outer panel upon the end of the inner panel, to be followed by a hemming process, wherein said inner panel is provided adjacent to its end with a recess which is deepened toward and welded to said outer panel.

BRIEF DESCRIPTION OF THE DRAWINGS

FIGS. 1 to 3 illustrate by way of an example an embodiment of the vehicular trunk lid structure according to the present invention wherein:

FIG. 1 is a perspective view generally illustrating an essential portion of the invention;

FIG. 2 is a view in the direction of arrow II in FIG. 1;

FIG. 3 is a cross-sectional view taken along a line III—III in FIG. 1 rotated to show the trunk of the invention in its normal closed position.

DETAILED DESCRIPTION OF THE PREFERRED EMBODIMENT

A preferred embodiment of the vehicular trunk lid structure according to the principle of the present invention will be described hereinbelow, with reference to several accompanying drawings.

Figure 1:
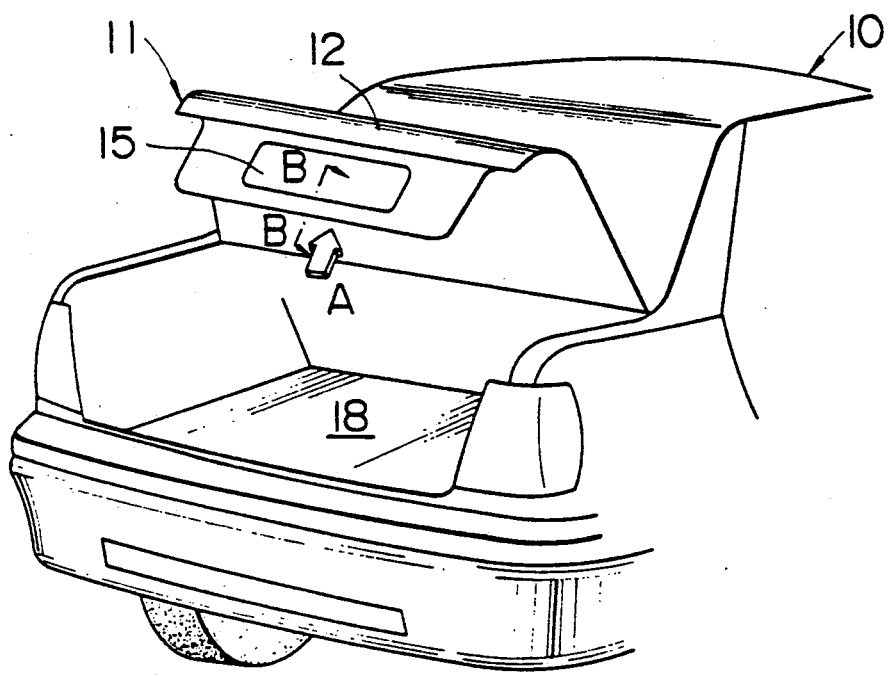
Figure 2:
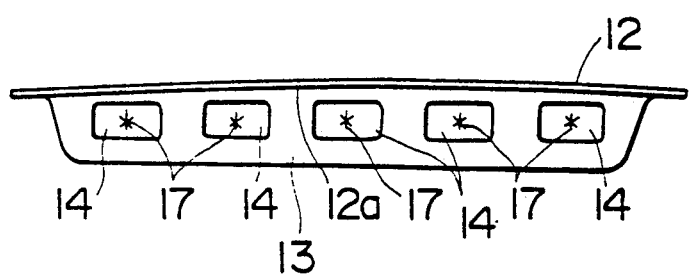
Figure 4:
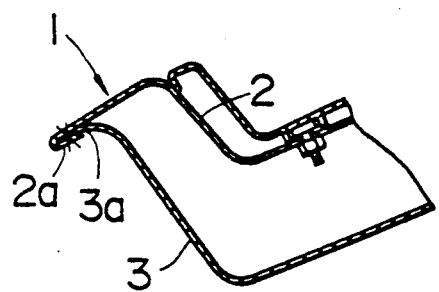
FIG. 4 is a cross-sectional view illustrating an essential portion of traditional vehicular trunk lid structure.
Figure 3:
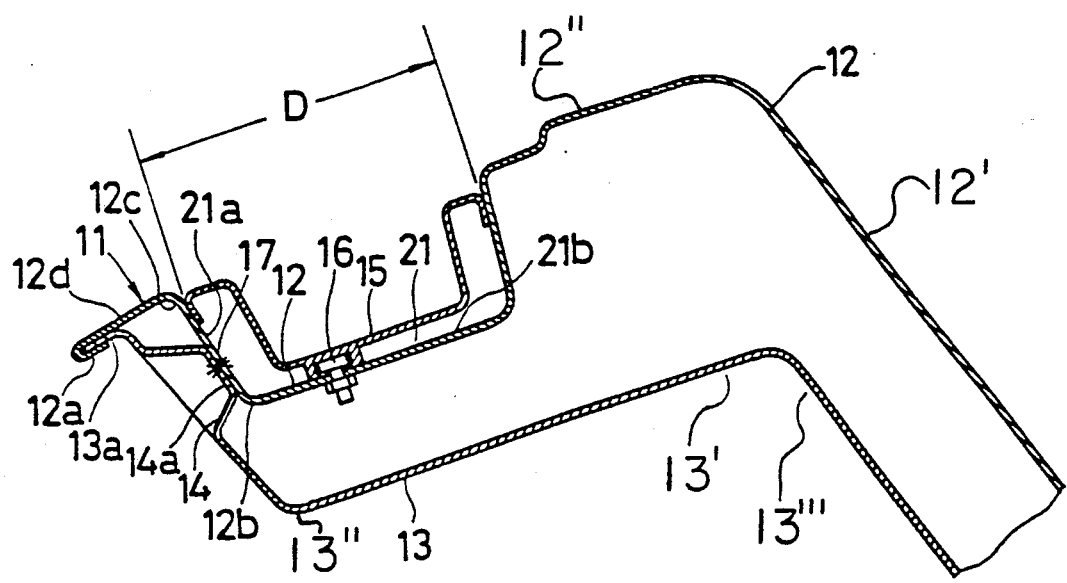

FIG. 1 through FIG. 3 illustrate one embodiment of the present invention. The trunk lid structure of the present invention comprises a trunk lid generally designated 11 a vehicle 10 with an outer panel 12 and an inner panel 13. These outer and inner panels 12 and 13 have substantially (panel 12 is substantially L-shaped in cross section and panel 13 is substantially step shaped including an L-shaped portion) a crank-shaped cross sections. In this case, the end 12a of the outer panel 12 adjacent panel portion 12d is overlapped upon the end 13a of the inner panel 13 and then hemmed so that the end 12a may overwrap the end 13a. A plurality of recesses 14 are defined adjacent to the end 13a of the inner panel 18. The recesses 14 which extend toward the outer panel 12 each have bottom portions 14a spot-welded to the interior surface of the outer panel 12. At this location the outer panel defines a recess zone 21 with a side wall or an outer panel recess was 21a. Moreover, a trim element 15 is secured to the exterior surface of the outer panel 12 by means of a bolt 16 as in the prior art. The trim element 15 is formed with dimensions sufficiently large to cover the weld bead 17 on the outer panel 12. The presence of the trim panel 15 serves to conceal the weld bead 17 on the outer panel to be obscured from the outside.

FIG. 3 shows the door panel in its normally closed position wherein the inner panel 13 includes an inner panel first wall 13" which is connected to an inner panel second wall second 13' in a substantially L-shape. These two walls are also connected to a third inner wall 13''' and together the three inner walls form a step-shaped member 13. The outer panel 12 includes an outer first wall 12' which is normally substantially horizontal and an outer second wall 12" which is normally in a vertical position. As can be seen in FIG. 3 the inner third wall 13''' is substantially parallel and spaced apart from the outer first wall 12'. The inner second wall 13' is positioned parallel to and spaced from the outer second panel 12". The outer second wall 12" and inner second wall 13' are normally in a vertical position. The first inner panel 13" is disposed normally in a substantially horizontal position.

Since the recess 14 is not oriented in the direction of the exterior surface of the outer panel 12 as illustrated in FIG. 3, it is concealed inside the trunk room 18 when the trunk lid 11 is closed and thus the weld bead 17 due to the spot welding is also concealed to be obscured from the outside.

Consequently, the need for a finishing operation to remove the weld bead 17 is eliminated, and thereby an improvement in the aesthetics of the appearance is realized.

According to the preferred embodiment, the outer panel is provided with a plurality of recesses, but the scope of the present invention is not limited to this arrangement, and a series of recesses may be formed instead of said plurality of recesses.

As described hereinbefore, the vehicular trunk lid structure of the present invention is arranged such that recesses are defined adjacent to the end of the inner panel and the bottoms of the recesses are spot-welded to the outer panel. Thus, when the trunk lid is closed, the weld bead due to the spot-welding is concealed inside the trunk room to be obscured from the outside, and therefore a finishing step, to remove the weld bead, is not required. As a consequence, an aesthetic improvement can be realized and a manufacturing cost can be reduced.

In addition, the presence of the recesses may serve to increase the strength of the trunk lid and the selection of area to be spot-welded adjacent to the end of inner panel results in the reinforcement of the hemmed portion.

What is claimed is:

1. A vehicle trunk lid structure comprising: an outer panel bent in a substantially L shape with a first wall normally in a horizontal position and a second wall normally in a vertical position, said first wall and said second wall defining a recess zone substantially at a center of said second wall, said recess zone being formed by bent portions of said outer panel for fixation of a trim element; an inner panel bent in a substantially L shape, positioned spaced from said outer panel and including an inner panel first wall normally in a horizontal position and an inner panel second wall normally in a vertical position and including an end edge of said inner panel second wall, said outer panel including an end overlapping said end edge of said inner panel second wall, said inner panel defining a recessed wall portion with said inner panel recessed wall portion being positioned adjacent said outer panel first wall of said recess zone; and a weld connecting said inner panel first wall to said outer panel first wall.

2. An automobile trunk lid structure according to claim 1, wherein said trim element is positioned in said recess zone of said outer panel covering said weld on a side of said outer panel opposite said inner panel.

3. A vehicle trunk lid structure according to claim 1, wherein said inner panel includes an inner panel third wall cooperating with said first and second walls, bent in an L shape, to form a step shaped member said inner panel third wall being normally substantially horizontal and being connected to said inner panel second wall, said inner panel third wall being substantially parallel to said outer panel first wall.

4. A vehicle trunk lid structure comprising: in outer panel bent in a substantially L shape, an inner panel bent in a substantially L shape, the outer panel having a recess for securing a trim element, said outer panel having an outer panel end, and said inner panel having an inner panel end, said outer panel end being overlapped on said inner panel end; said recess having a side wall and a bottom wall, said side wall being defined between bent portions of said outer panel, said inner panel having further recesses being adjacent to said inner panel end, said further recesses having bottoms being welded to said outer panel recess.

5. A trunk lid structure according to claim 4 wherein said trim is positioned in said outer panel recess and covers a weld bead of the outer panel.

6. A vehicle trunk lid structure according to claim 4, wherein said inner panel includes an inner panel third wall cooperating with said first and second walls, bent in an L shape, to form a step shaped member said inner panel third wall being normally substantially horizontal and being connected to said inner panel second wall, said inner panel third wall being substantially parallel to said outer panel first wall.

* * * * *

UNITED STATES PATENT AND TRADEMARK OFFICE
CERTIFICATE OF CORRECTION

PATENT NO. : 5,072,985
DATED : December 17, 1991
INVENTOR(S) : Yanagimoto, et. al.

It is certified that error appears in the above-indentified patent and that said Letters Patent is hereby corrected as shown below:

On the Title page, item [73], Assignee should read as follows:
--Suzuki Motor Corporation,
Shizuoaka-Ken, Japan--.

Signed and Sealed this

Twenty-eighth Day of June, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,072,985
DATED : December 17, 1990
INVENTOR(S) : Yanagimoto et al It is certified that error appears in the above-identified patent and that said Letters Patent is hereby corrected as shown below:

On the title page, Item [73] Assignee should read as follows:

--Suzuki Motor Corporation,
Shizuoka-ken, Japan--.

Signed and Sealed this

Twenty-sixth Day of July, 1994

*Attest:*

BRUCE LEHMAN

*Attesting Officer*    *Commissioner of Patents and Trademarks*